March 3, 1936.  J. V. RICE, JR  2,032,378
WEIGHING AND RECORDING MECHANISM
Filed March 19, 1932  3 Sheets-Sheet 2
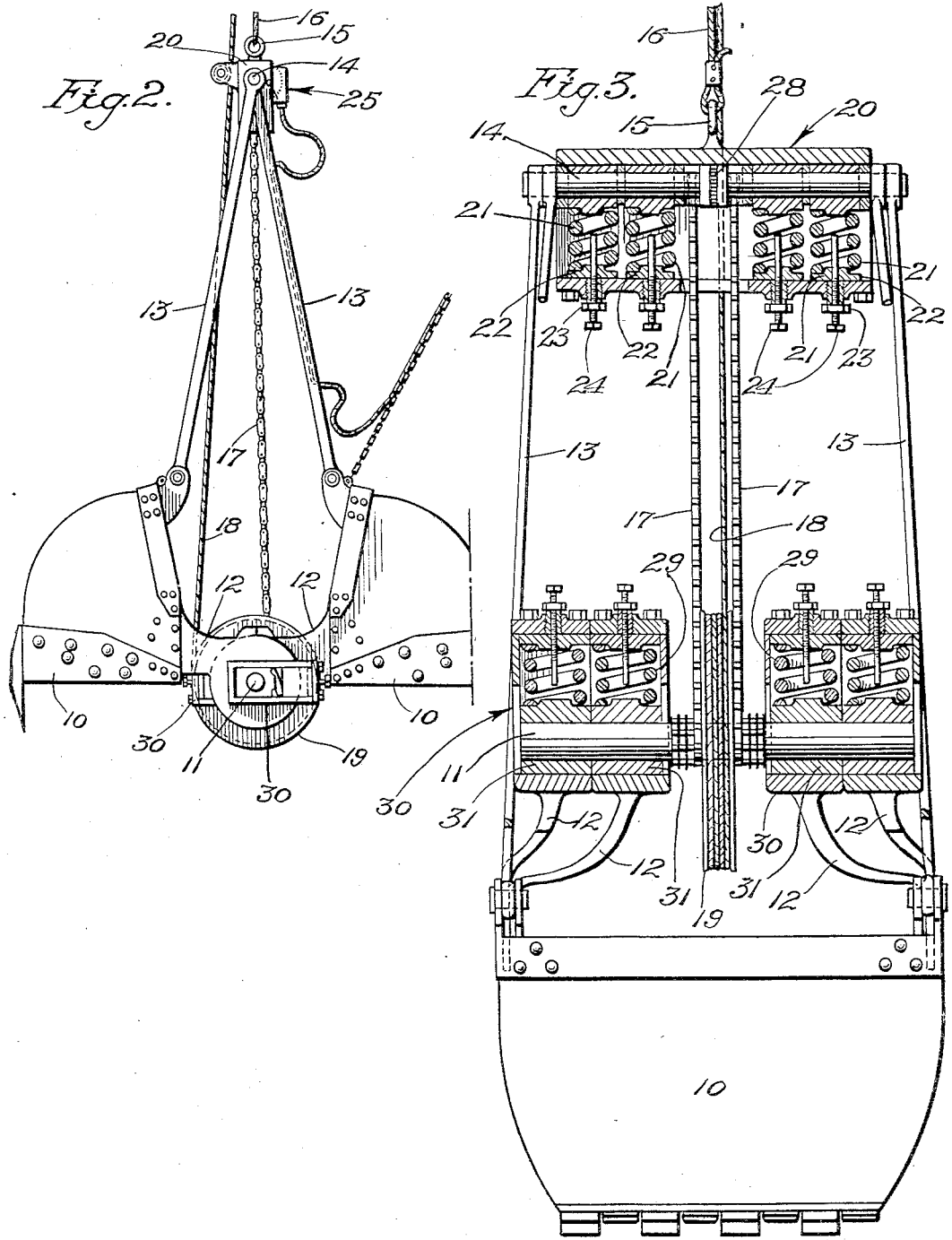
Inventor:—
John V. Rice Jr.
by his Attorneys
Howson & Howson

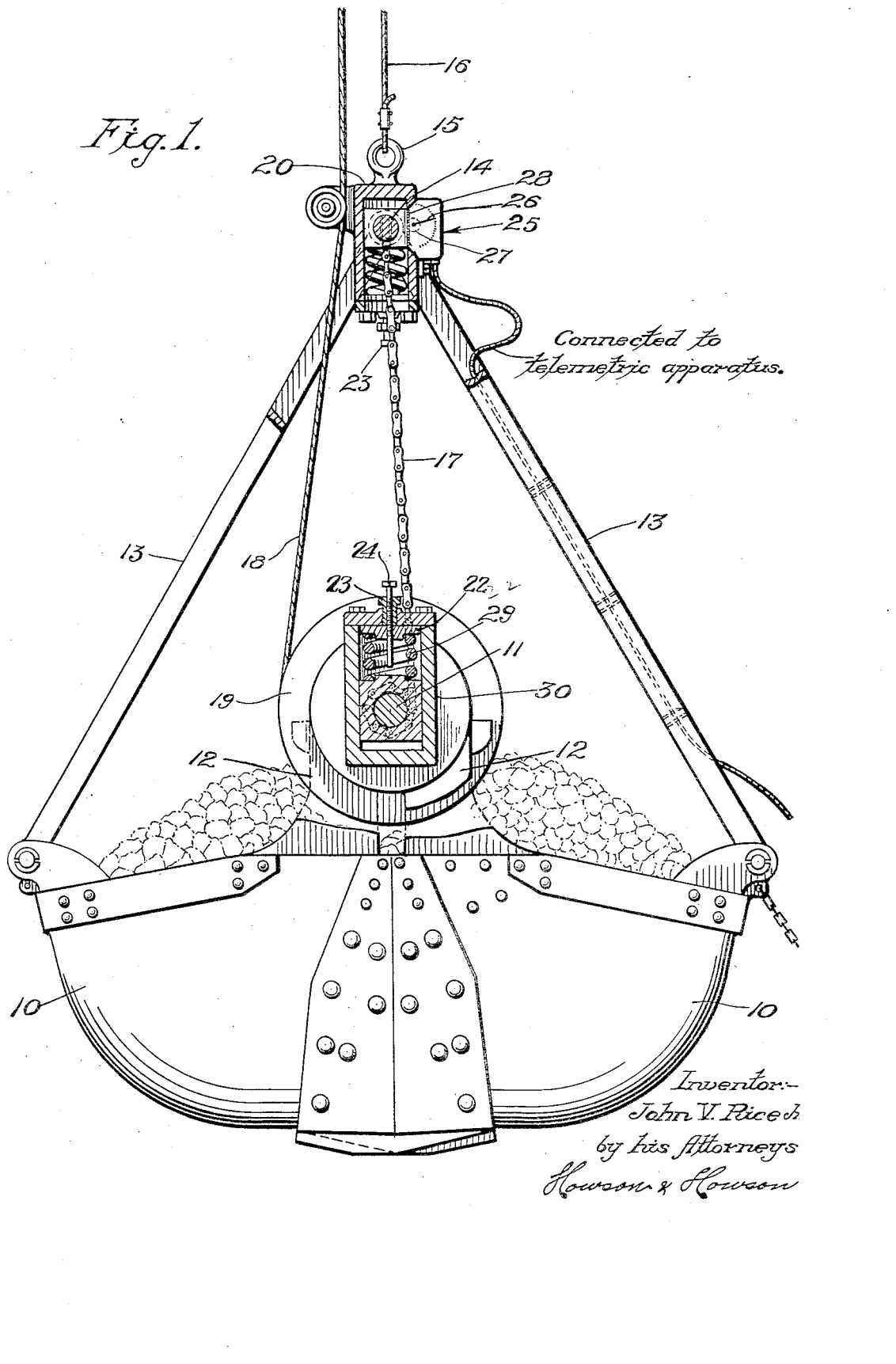

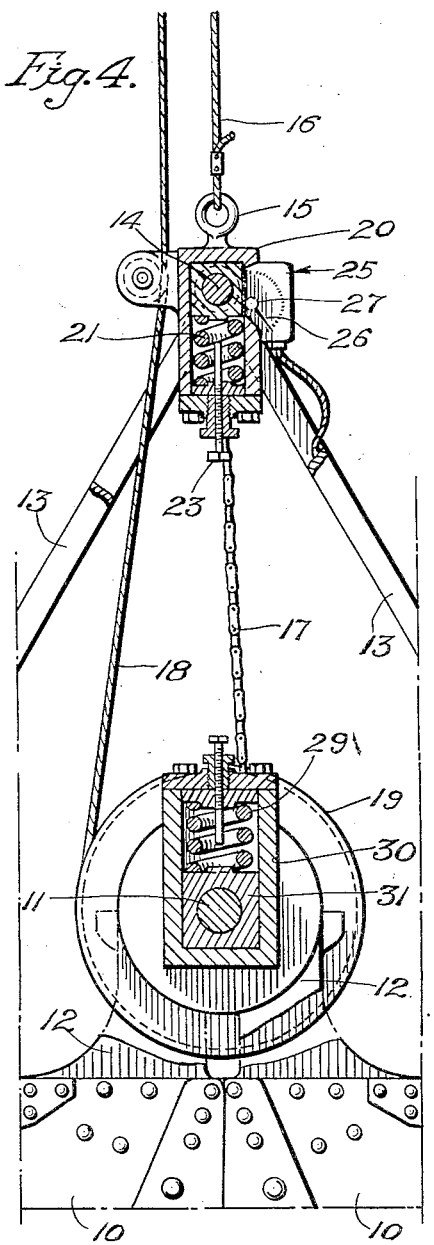
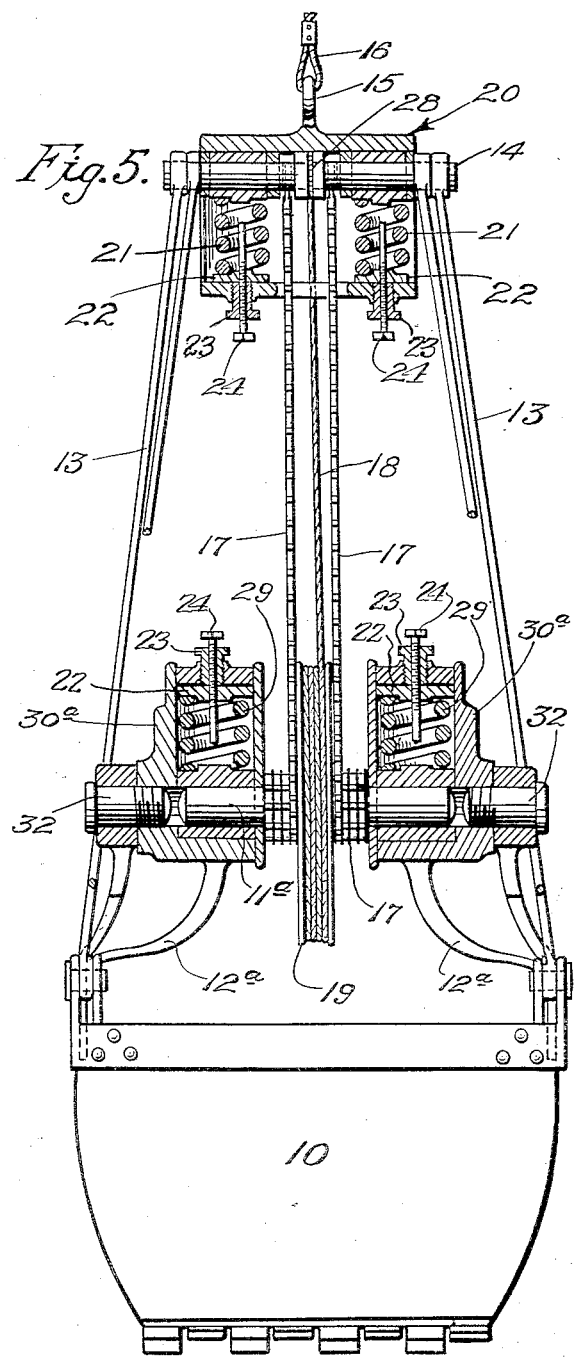

Patented Mar. 3, 1936

2,032,378

UNITED STATES PATENT OFFICE 2,032,378

WEIGHING AND RECORDING MECHANISM

John V. Rice, Jr., Bordentown, N. J., assignor to John V. Rice, Jr. Corporation, Philadelphia, Pa., a corporation of Delaware Application March 19, 1932, Serial No. 599,962

17 Claims. (Cl. 265—52)

This invention relates to weighing mechanisms, and more particularly to an apparatus for accurately determining the weight of the contents of multi-line hoisting buckets such as those of the ordinary clam shell type.

It is, in many instances, desirable or necessary that the contents of multi-line hoisting buckets be accurately weighed during the time that the material is being shifted by the bucket from a pile, or other place of storage, to a given receptacle.

Multi-line hoisting buckets, and particularly that type of hoisting bucket ordinarily known as the clam shell, are supported from a plurality of lines which may, and usually do, carry different proportions of weight of the bucket. This is particularly noticeable in the clam shell bucket due to the fact that one of the two lines usually employed in supporting the bucket is employed for the purpose of maintaining the bucket in closed position. As this line is separately manipulated from the line, or lines, directly supporting the bucket, it follows that the proportionate weights distributed between the operating line and the supporting line will vary considerably, not only when the load is first picked up but during movement of the load from the point where it is acquired to the point where it is delivered. As the position of the bucket is changed with relation to the boom or carriage from which it is suspended and the hoisting and closing lines are usually operated by independent drums, there is often considerable variation in the load supported by the lines as the bucket is in transit. This has necessitated the use, under conditions requiring accurate weighing, individually, of the bucket contents, the use of weighing hoppers into which the contents of the bucket are discharged.

An important object of the present invention is the provision of means for obtaining an accurate indication and, if desired, recording of the weight of the contents of such buckets.

A further object of the invention is the provision of means whereby the strain between the bucket bail and the closing line may be balanced at a desired proportion.

A still further object of the invention is the provision in a structure of this character of an arrangement such that sudden stresses and strains placed upon the hoisting and closing lines are cushioned so that the frequent breakage of these lines which now occurs is, to a great extent, eliminated.

A still further object of the invention is the provision of a structure of this character which may be readily incorporated in buckets of standard manufacture.

These and other objects I attain by yieldably connecting the hoisting and closing lines to the bucket through flexible connections and operatively connecting these flexible connections by an equalizer mechanism whereby upon nonproportionate deflection of the flexible connections the bucket weights are shifted until a proper proportionate balance is attained. With such a construction it is obviously possible to obtain an accurate measure of the weight of the bucket contents by translating the deflection of either of the flexible connections.

In the drawings:

Fig. 1 is a side elevation partially in section showing a weighing bucket constructed in accordance with my invention;

Fig. 2 is a side elevation of a bucket when in open position;

Fig. 3 is an end elevation of the unloaded bucket partially in section;

Fig. 4 is a fragmentary side elevation partially in section of the unloaded bucket; and Fig. 5 is a view similar to that of Fig. 3 showing a modified method of providing the flexible connections.

Referring now more particularly to the drawings, the numeral 10 designates bucket sections pivotally connected at their upper adjacent portions by a shaft 11 which is engaged between arms 12 extending upwardly from the sections. The outer remote portions of the bucket sections are connected through links 13 with a pivot 14 vertically spaced above the shaft 11 and operatively connected through a bail eye 15 to a hoisting line 16. A flexible connection is provided between the pivot 14 and shaft 11 as indicated at 17 this connection being fixed to the pivot 14 and wound about the shaft 11 so that when shaft 11 is rotated the flexible element is wound or unwound on shaft 11 and the shaft 11 thereby caused to approach or separate from pivot 14. Rotation is imparted to shaft 11 by the closing line 18 which is wound about a drum 19 secured to shaft 11. It will be obvious that with the bucket in the position shown in Fig. 2, a pull upon the line 18 will cause rotation of shaft 11 winding the flexible element thereon with the result that the bucket sections are moved to the closed position. When in the closed position, a portion of the weight of the bucket and its contents is borne by each of lines 16 and 18.

In accordance with my invention, the bail 20 which, in the ordinary clam shell bucket construction merely comprises a mounting for the pivot 14 which incorporates the bail eye 15, is made in the form of a vertically elongated cage in which the pivot 14 is vertically movable and normally maintained against the upper wall thereof by means of springs 21, thus providing a flexible connection between the bucket and the hoist line 16. Springs 21 are adjustable as to tension through movable seats 22 for the lower ends of said springs and screws 23 for adjusting said seats. Adjustable stops 24 threaded through the screws 23 are preferably provided for limiting downward movement of pivot 14. Cage 20 has an opening in its side wall adjacent which the outer surface of the cage mounts the actuating or controlling instrument 25 of a telemeter, said controlling instrument including a shaft equipped with a pointer 26 and a pinion 27, said pinion engaging a rack 28 formed upon the pivot element 14. The instrument 25 merely comprises a suitable means for measuring deflection of the flexible connection between the hoist line 16 and the bucket.

The free ends of the bucket section arms 12 are yieldably engaged with the shaft 11 through springs 29 which urge the shaft 11 away from the pivot 14. In the form shown in Figs. 1 to 4, the upper ends of the arms 12 are each in the form of a vertically elongated cage 30 slidably mounting a bearing 31 for the shaft 11. Springs 29 engage against these bearings and are made adjustable and provided with adjustable stops after the manner of the springs 21. In the form shown in Fig. 5, two of the arms 12a of the bucket section are provided with cages 30a in which the springs 29 are mounted. The cages 30a mount trunnions 32 co-axial with the shaft 11a in the normal or unloaded position of the bucket. In this structure, as in the structure of the remaining figures, the shaft 11 is yieldable to move toward the pivot 14. In the figure just referred to the mounting of the pivot 14 is modified to the extent that the number of springs 21 employed therewith is reduced in number.

In operation of a device of the character described when the load is imposed upon the bucket, the strain applied through the closing line and the eye 15 will be equalized until it is in the ratio of the relative strengths of the springs 21 and 29. If the strain placed, for example, on the closing line 18 is above this ratio springs 29 will yield so that the weight placed upon the eye 15 will be increased. Similarly, if the weight placed upon the eye 15 is excessive, the springs 21 will yield until the proper proportion of weight is borne by the closing line 18. It will, thus, be understood that springs 21 will be compressed at all times when the bucket is loaded to a point proportionate to the load borne by the bucket. It will be noted that the connections of the closing line to the shaft 11 and of the shaft 11 to the pivot 14 constitute an equalizer mechanism which might, obviously, be substituted for by other suitable equalizer mechanism without departing from the spirit of the invention.

Since the compression of springs 21 permits a downward movement of pivot 14, this pivot will, through its rack 28 and the pinion 27, operate the control mechanism 25 of the telemetric apparatus, thus providing telegraphed or electrically transmitted signals to be received by a conveniently stationed attendant. While I have referred to the use of electrical transmission and have illustrated a particular method of operating the control apparatus 25, it will be understood that any kind of transmission mechanism can be employed and the movement of the pivot 14 might be applied in any suitable manner to actuate such mechanism. The structure being otherwise capable of modification without in any manner departing from the spirit of the invention, I do not wish to be understood as limiting myself thereto except as hereinafter claimed.

I claim:

1. The combination with a bucket of the type described of two lines supporting the same, a yieldable connection between each line and the bucket, and means operative upon non-proportionate yielding of said connections to transfer a portion of the bucket weight from one to the other thereof.

2. The combination with a bucket of the type described of two lines supporting the same, a yieldable connection between each line and the bucket, means operative upon non-proportionate yielding of said connections to transfer a portion of the bucket weight from one to the other thereof and weight indicating mechanism actuated by deflection of one of said yieldable connections.

3. In a grab bucket of the clam shell type, the combination with a sectional bucket of hoisting and closing lines for supporting said bucket, yieldable connections between said lines and said bucket and equalizer mechanism connecting said connections.

4. In a grab bucket of the clam shell type, the combination with a sectional bucket of hoisting and closing lines for supporting said bucket, yieldable connections between said lines and said bucket and means operative upon non-proportionate yielding of said connections to transfer a portion of the bucket weight from one to the other thereof.

5. In a grab bucket of the clam shell type, the combination with a sectional bucket of hoisting and closing lines for supporting said bucket, yieldable connections between said lines and said bucket, means operative upon non-proportionate yielding of said connections to transfer a portion of the bucket weight from one to the other thereof and weight indicating mechanism operated by deflection of one of said connections.

6. In a grab bucket of the clam shell type, the combination with a sectional bucket of hoisting and closing lines for supporting said bucket, yieldable connections between said lines and said bucket, means for transferring a portion of the supported bucket weight from one to another of said connections constructed and arranged to provide definite proportionate deflections of said yieldable connections, and a translating device operated by the deflection of one of said connections.

7. In a grab bucket of the clam shell type comprising pivotally connected bucket sections movable to open and closed positions, a support for the bucket, a yieldable connection between the support and bucket, a closing line, a connection between the bucket and said closing line yieldable under strains applied to maintain the bucket closed, and means operative upon non-proportionate yielding of said connections to transfer a portion of said bucket weight from one to the other thereof to establish such proportionate yielding.

8. In a grab bucket of the clam shell type comprising pivotally connected bucket sections movable to open and closed positions, a support for the bucket, a yieldable connection between the support and bucket, a closing line, a connection between the bucket and said closing line yieldable under strains applied to maintain the bucket closed, means operative upon non-proportionate yielding of said connections to transfer a portion of the bucket weight from one to the other thereof to establish such proportionate yielding and a translating device operated by the deflection of one of said connections.

9. A grab bucket comprising bucket sections, pivot means connecting the same and about which the sections may move from open to closed positions, links connected at their lower ends to said sections at points spaced from the pivots of the sections, a second pivot means to which the upper ends of the links are connected, a support for said second pivot means including a yieldable element, yieldable means interposed between the first-named pivot means and the bucket sections and a closing connection for the bucket engaging the last-named pivot means.

10. In a grab bucket of the clam shell type comprising pivotally connected bucket sections movable to open and closed positions, a cage adapted for engagement with a hoist line, a pivot element vertically movable in said cage, springs urging said pivot element upwardly in said cage, links connected to said pivot element and to the said bucket sections at points spaced from the pivots of the bucket sections, cage means supported from the pivot-engaging elements of the buckets, a shaft mounted for vertical movement in said cage means, springs urging said shaft downwardly in said cage means, a line connected to said shaft to rotate the same and flexible means connected to said pivot element and to the said shaft, said flexible means adapted to be wound upon the shaft when rotated by said line.

11. In a grab bucket of the clam shell type comprising pivotally connected bucket sections movable to open and closed positions, a cage adapted for engagement with a hoist line, a pivot element vertically movable in said cage, springs urging said pivot element upwardly in said cage, links connected to said pivot element and to the said bucket sections at points spaced from the pivots of the bucket sections, cage means supported from the pivot-engaging elements of the buckets, a shaft mounted for vertical movement in said cage means, springs urging said shaft downwardly in said cage means, a line connected to said shaft to rotate the same, flexible means connected to said pivot element and to the said shaft, said flexible means adapted to be wound upon the shaft when rotated by said line, and means for indicating at a remote point movements of said pivot element in its cage.

12. In a grab bucket of the clam shell type comprising pivotally connected bucket sections movable to open and closed positions, a cage adapted for engagement with a hoist line, a pivot element vertically movable in said cage, springs urging said pivot element upwardly in said cage, links connected to said pivot element and to the said bucket sections at points spaced from the pivots of the bucket sections, cage means supported from the pivot-engaging elements of the buckets, a shaft mounted for vertical movement in said cage means, springs urging said shaft downwardly in said cage means, a line connected to said shaft to rotate the same, flexible means connected to said pivot element and to the said shaft, said flexible means adapted to be wound upon the shaft when rotated by said line, and means for indicating the extent of displacement of the pivot element in its cage.

13. In a grab bucket of the clam shell type comprising pivotally connected bucket sections movable to open and closed positions, a cage adapted for engagement with a hoist line, a pivot element vertically movable in said cage, springs urging said pivot element upwardly in said cage, links connected to said pivot element and to the said bucket sections at points spaced from the pivots of the bucket sections, cage means supported from the pivot-engaging elements of the buckets, a shaft mounted for vertical movement in said cage means, springs urging said shaft downwardly in said cage means, a line connected to said shaft to rotate the same and flexible means connected to said pivot element and to the said shaft, said flexible means adapted to be wound upon the shaft when rotated by said line, said shaft comprising the pivotal connection between the bucket sections.

14. In a grab bucket of the clam shell type comprising pivotally connected bucket sections movable to open and closed positions, a cage adapted for engagement with a hoist line, a pivot element vertically movable in said cage, springs urging said pivot element upwardly in said cage, links connected to said pivot element and to the said bucket sections at points spaced from the pivots of the bucket sections, cage means supported from the pivot-engaging elements of the buckets, a shaft mounted for vertical movement in said cage means, springs urging said shaft downwardly in said cage means, a line connected to said shaft to rotate the same, flexible means connected to said pivot element and to the said shaft, said flexible means adapted to be wound upon the shaft when rotated by said line, and adjustable means for regulating the tension of said springs.

15. The combination with a container of two independent lines supporting the same, equalizer means operatively connecting the lines to maintain a predetermined proportion of the load on one of the lines, and means to register the load strain imposed on the line.

16. The combination with a container of a plurality of independent lines supporting the container and means to distribute load strains imposed upon the lines by the container to maintain a predetermined portion of the load strain on each line.

17. The combination with a container of a plurality of independent lines supporting the container, means to distribute load strains imposed upon the lines by the container to maintain a predetermined portion of the load strain on each line, and means to register the strain imposed upon one line.

JOHN V. RICE, Jr.